United States Patent
Walz et al.

(10) Patent No.: US 8,393,143 B2
(45) Date of Patent: Mar. 12, 2013

(54) PROCEDURE FOR OPERATING A COMBUSTION ENGINE WITH A SCR-CATALYZER

(75) Inventors: Christian Walz, Durmersheim (DE); Frank Schweizer, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 477 days.

(21) Appl. No.: 12/437,262

(22) Filed: May 7, 2009

(65) Prior Publication Data

US 2010/0050611 A1 Mar. 4, 2010

(30) Foreign Application Priority Data

Aug. 27, 2008 (DE) .......................... 10 2008 041 603

(51) Int. Cl.
*F01N 3/00* (2006.01)

(52) U.S. Cl. .......................................... 60/295; 60/301

(58) Field of Classification Search .................... 60/274, 60/277, 286, 295, 301
See application file for complete search history.

(56) References Cited

U.S. PATENT DOCUMENTS

| | | | | |
|---|---|---|---|---|
| 2004/0203162 A1* | 10/2004 | Wickert | ......................... | 436/55 |
| 2006/0000202 A1* | 1/2006 | Ripper et al. | ................... | 60/286 |
| 2006/0080952 A1* | 4/2006 | Wickert et al. | ................... | 60/286 |
| 2006/0096278 A1* | 5/2006 | Lueders et al. | ................... | 60/286 |
| 2007/0144151 A1* | 6/2007 | Lueders et al. | ................... | 60/286 |
| 2007/0251224 A1* | 11/2007 | Andrews et al. | ................ | 60/301 |
| 2008/0216463 A1* | 9/2008 | Chaineux et al. | ............... | 60/274 |
| 2008/0229728 A1* | 9/2008 | Stewart et al. | ................... | 60/274 |
| 2008/0250774 A1* | 10/2008 | Solbrig | ........................... | 60/295 |

FOREIGN PATENT DOCUMENTS

| | | |
|---|---|---|
| DE | 10 2004 031 624 | 2/2006 |
| DE | 10 2005 042 490 | 3/2007 |

* cited by examiner

*Primary Examiner* — Thomas Denion
*Assistant Examiner* — Patrick Maines
(74) *Attorney, Agent, or Firm* — Merchant & Gould P.C.

(57) ABSTRACT

A combustion engine has in the exhaust gas area a SCR-catalyzer with a $NH_3$-filling level, a metering device for supplying the SCR-catalyzer with reactant for reducing nitrous gases, and a downstream $NH_3$-sensitive NOx-sensor. One theoretical value for the NOx downstream of the SCR-catalyzer is compared to an actual NOx-value downstream of the SCR-catalyzer. A reasonability check includes determining a first value for one comparison parameter, which represents the state before a system intervention for adapting the $NH_3$-filling level. A system intervention for adapting the NH3-filling level is carried out and a second value of the comparison parameter is detected. From the comparison of the first value and the second value the reasonability, the non-reasonability, or non-preciseness of the system intervention is assumed.

19 Claims, 4 Drawing Sheets

PROCEDURE FOR OPERATING A COMBUSTION ENGINE WITH A SCR-CATALYZER

TECHNICAL FIELD

The present invention concerns a procedure for operating a combustion engine whose exhaust gas area provides at least one SCR-catalyzer, at least a metering device for supplying the SCR-catalyzer with a reactant and at least one NOx-sensor. Further subjects of the present invention are a computer program and a computer program product, which are suitable for implementing the procedure.

BACKGROUND

Procedures and devices for operating a combustion engine are known, in whose exhaust gas area a SCR-catalyzer (selective catalytic reduction) is arranged, which reduces the nitrous gases (NOx) that are contains in the exhaust gas of the combustion engine into nitrogen in the presence of a reducing agent. Thereby the nitrous gases in the exhaust gas can be significantly reduced. Preferably nitrous gases (NO, $NO_2$) are hereby reduced, while undesired side-reactions are mostly suppressed. Ammonia ($NH_3$) is required for the course of the reaction, which is mixed to the exhaust gas. Therefore $NH_3$ or $NH_3$-splitting reagents are used as reactant. Usually a watery urea solution is therefore used, which is injected before the SCR-catalyzer into the exhaust gas system with the aid of a metering device. From the solution $NH_3$ is created, which works a reducing agent.

The metering of the reactant preferably takes place depending on the power-operated nitrous gas emissions and is therefore depending on the momentary engine speed and the torque of the engine. The metering is therefore carried out depending on operating parameters of the combustion engine and depending on exhaust gas parameters.

The metering of the reactant has to be determined carefully. At a too low metering the nitrous gases in the SCR-catalyzer cannot be reduced completely anymore. At a too high metering a so-called reactant slip ($NH_3$-slip) can occur, which causes on the one hand an odor nuisance by the released ammonia and on the other hand an unnecessarily high consumption of the reactant.

The efficiency of a SCR-catalyzer depends on the temperature and also significantly on the $NH_3$-filling level. SCR-catalyzers accumulate by absorption a certain amount of ammonia on their surface. Thereby also stored $NH_3$ is available for the nitrous gas reduction besides the directly metered ammonia in the form of an urea water solution, whereby the efficiency towards an empty catalyzer increases. The storage behavior depends on the operating temperature of the catalyzer, which means the lower the temperature the higher the storage capacity.

If the catalyzer has filled its storage completely a $NH_3$ slip can occur at load jumps. This can be the case even if no reactant is injected anymore. Because it is usually desired to achieve a high nitrous gas conversion it is required to operate the SCR-catalyzer at a high $NH_3$-filling level. Therefore a $NH_3$-slip can shortly occur even at an exactly planned metering amount under unsteady conditions.

In order to optimize the metering of the reactant DE 10 2004 031 624 A1 suggests a procedure for operating a SCR-catalyzer that is used for purifying the exhaust gas of a combustion engine, at which a controlling or a regulation of the filling level of the reactant, in particular the $NH_3$-filling level, is provided in the SCR-catalyzer on to a default threshold value. The planned default of the threshold value shall allow that in particular at unsteady states of the combustion engine on the one hand a sufficient amount of reactant is provided for the catalytic reduction of nitrous gases and that on the other and a slip of the reactant, in particular of $NH_3$, is avoided. The reactant filling level of the SCR-catalyzer is determined with the aid of a catalyzer model (SCR-model). Thereby the NOx-mass flow that is flowing into the SCR-catalyzer, the NOx-mass flow that is leaving the SCR-catalyzer, the catalyzer temperature as well as the reactant slip are considered. The efficiency of the SCR-catalyzer depends on the catalytic activity, which is low at low operating parameters, passes a maximum with an increasing operating temperature and sinks again at a more increasing operating temperature. Even the maximally possible reactant filling level of the SCR-catalyzer depends on the operating temperature of the SCR-catalyzer as described above.

The calculation of the necessary amount of the reactant is subject to numerous errors and deviations, for example the engine raw emissions, the conversion rate of the catalyzer and also inaccuracies of the metering system have an influence on the calculation of the metering amount. Therefore an adaptation of the filling level is required. In order to carry out an adaptation a NOx-sensor is usually used, which can detect the nitrous gas amount downstream of the SCR-catalyzer. Due to the measuring principle at known NOx-sensors these sensors show a lateral sensitivity towards $NH_3$. Therefore a usually used NOx-sensor measures a sum signal of NOx and $NH_3$. The SCR-model calculates on the other hand only the NOx-emissions after the SCR-catalyzer. Therefore deviations from the measured NOx-sensor value, a so-called slip, can have three causes: Besides the model inaccuracy as first cause an underestimation of the filling level and therefore a release of $NH_3$ ($NH_3$-slip) and an overestimation of the filling level and therefore a minimal conversion and release of NOx (NOx-slip) can be the cause of the deviation.

In order to carry out an adaptation of the metering system first an increase of the calculated actual filling level in the SCR-catalyzer is usually carried out at a deviation of the sensor value from the calculated value. As a reaction upon this the metering amount of the reactant is taken back by the system. But because the $NH_3$-slip causes a deviation between the calculated and the measured value in the same direction at too high $NH_3$-filling level and also at a too low nitrous gas at a too low $NH_3$-filling level, it cannot be distinguished between $NH_3$-slip and too low conversion (NOx-slip). Therefore the adaptation reacts in the wrong direction, as long as a too low nitrous gas conversion (minimal conversion) is present. The nitrous gas conversion diminishes hereby more. It is therefore required to carry out a reasonability test of the adaptation, in order to detect an erroneous adaptation and to correct it if necessary.

In the course of the reasonability check it is decided whether the intervention into the metering of the reactant by increasing the actual filling level in the SCR-model was correct or not. Hereby the calculated conversion is compared with the metered reactant +$NH_3$ from the desorption as well as the change of the $NH_3$-nominal filling level. If these relations are not reasonable an incorrect adaptation is detected, which means the cause for the deviation of the calculated NOx-value and measured NOx-value was based on an undermetering or a minimal conversion and not on a $NH_3$-slip. Correspondingly the metering strategy is newly installed. In order for the SCR-system to adjust again to the actual operating point the filling level adaptation as well as reasonability test are locked for an applied time.

This procedure has several disadvantages. Thus the storage filling level in the SCR-catalyzer is increased at a detected $NH_3$-slip at regular intervals; as a result the metering amount is reduced, so that conversion drops can occur in the nitrous gas conversion with consequences for the exhaust gas composition during the adaptation. Furthermore long reasonability check phases, for example phases of 200 seconds or more, are necessary for the comparison between the relation of calculated conversion and metered reactant +$NH_3$ from the desorption as well as the change of the $NH_3$-nominal filling level. Therefore the period of time until the optimal adaptation of the system is relatively long and until then a not optimal function in the SCR-catalyzer exists. In addition the reasonability check result has often to be applied in an uncertain manner and the function difficulty.

The invention has therefore the task to avoid the mentioned disadvantages and to provide a new reasonability check procedure at the operation of a combustion engine with a SCR-catalyzer, which enables a reliable result of the reasonability check and which simultaneously allows very fast statements about the reasonability.

This task is solved by a procedure for operating a combustion engine, as it is described in claim 1. Preferred embodiments of this procedure are stated in the sub-claims.

SUMMARY

The procedure according to the invention for operating a combustion engine provides that at least one SCR-catalyzer is arranged in the exhaust gas area of the combustion engine with a $NH_3$-filling level, at least one metering device for supplying the SCR-catalyzer with reactant for reducing nitrous gases (NOx) and at least one downstream $NH_3$-sensitive NOx-sensor. At least one theoretical NOx-value is determined downstream of the SCR-catalyzer (NOx_mod). The value can for example be calculated with the aid of a theoretical model. The determination of the theoretical NOx-value preferably takes place with the aid of the so-called SCR-model, which is provided for controlling or regulating the $NH_3$-filling level on to a default nominal value and which can consider different factors. That value NOx-mod is compared to the actual NOx-value downstream of the SCR-catalyzer (NOx_sens). NOx_sens is preferably based on data, which is measured with a NOx-sensor. If the value deviate from each other, their difference usually exceeds a default threshold value, an adaptation of the $NH_3$-filling level of the $NH_3$-filling level is activated. According to the invention the undertaken adaptation of the $NH_3$-filling level is made reasonable by detecting at least one value of at least one comparison parameter as value A at an activated adaptation or adjustment of the $NH_3$-filling level, which represents the state of a system intervention for adapting the $NH_3$-filling level. This value is preferably saved. After at least one system intervention has been carried out for adapting the $NH_3$-filling level, at least one value (value B) of the comparison parameter is again detected, for example registered and stored in a memory. By the comparing value A and value B it is assumed whether the carried out adaptation of the $NH_3$-filling level was reasonable, not reasonable or not precisely.

Compared to usual procedures this procedure has the advantage that it can be carried out very quickly, for example within approximately 30 seconds up to approximately 60 seconds, in particular within approximately 45 seconds, and that thereby the reaction of the system upon a system intervention at a detected slip, which means at a difference between NOx_mod and NOx_sens, can be almost immediately checked. Hereby it is avoided that the NOx-conversion is reduced due to adaptation processes, at which the metering amount of the reactant has been lowered incorrectly, and thereby the exhaust gas treatment is not optimal anymore. By the procedure according to the invention a quick adjustment of the optimal metering amount can be carried out even at a high deviation of the $NH_3$-pre-control amount, for example at a high $NH_3$-over-metering, in order to ensure the optimal exhaust gas treatment. The procedure according to the invention for the reasonability check of the adaptation is very secure, in particular at stationary operating statuses.

The procedure according to the invention, which serves for the reasonability check of the adaptation of the $NH_3$-filling level in a SCR-catalyzer at the operation of a combustion engine, requires the use of a NOx-sensor downstream of the SCR-catalyzer like the known procedure. In the case of a deviation of the calculated values, which represent the NOx-emissions and are for example based on a known SCR-model, with the measured NO-values of a sensor, which is downstream of the SCR-catalyzer, the reasonability check is carried out according to the invention's procedure, by registering one or several actual values (values A) of at least one comparison parameter in a first phase (phase a) and by storing them in a memory. Subsequently or simultaneously a system intervention takes place, in order to adjust the $NH_3$-filling level. In a second subsequent phase (phase b) it is checked, whether the values of the comparison parameter have changed by detecting one or several corresponding values as values B and by evaluating them with the value or values from the first phase (phase a). Depending on the change of the values it can be decided whether the system intervention was reasonable, not reasonable or not precisely.

In a particularly preferred embodiment of the procedure according to the invention a further checking of the result is carried out, after which the reasonability, the non-reasonability or non-preciseness has been assumed. Therefore at least one further preferably short-termed system intervention, which takes place in the opposite direction of the first carried out system intervention, is carried out after implementing the described steps, in particular after detecting value B. An increase of the metering amount is for example carried out as a further system intervention and converted at a first carried out lowering of the metering amount. After or simultaneously with the implementation of the further system intervention at least one further value of the comparison parameter is detected as value C and the result of the procedure according to the invention is checked with the aid of a comparison of value B and value C. If for example an under-metering is assumed, because the lowering of the metering amount that has been carried out as first system intervention has not been reasonable, this result can be checked by a particularly short-termed under-metering in the course of a counter-check or verified. Thereby the reasonability check of the system intervention that has been carried out according to the invention can be implemented even more securely and robustly.

Preferably at least one NOx-value, in particular a measured NOx-value, downstream of the SCR-catalyzer is used as comparison parameter. By using NOx-values as comparison parameters a measure for the NOx-emissions can be provided. This way the reaction of the system upon the carried out system intervention can be directly detected. In other embodiments other exhaust gas values can be used, with which a reasonability check result can also be determined. Particularly preferred is a theoretical NOx-value is evaluated as comparison parameter, for example from the SCR-catalyzer, downstream of the SCR-catalyzer compared with a measured NOx-value downstream of the SCR-catalyzer. Preferably the difference of the NOx-value from the SCR-model and the measured NOx-value is used for this purpose. By considering the difference of these values as comparison parameters the accuracy and reproducibility of the reasonability check according to the invention can be increased.

Particularly advantageously the exhaust gas mass flow is considered at the evaluation or the comparison of the values A and B. Thereby the possibly different conditions in phase a and phase b can be taken into account, so that thereby no falsification of the results occurs.

In a preferred embodiment of the procedure according to the invention the NOx-value downstream of the SCR-catalyzer, which is used as comparison parameter, is a NOx-mass flow, a NOx-concentration, a NOx-conversion and/or a NOx-conversion efficiency. Corresponding values can be measured, registered and saved or stored with the aid of the NOx-sensor, which is downstream of the SCR-catalyzer. The integrated mass flow of NOx or the NOx-concentration can for example be used, whereby the values are corrected by the corresponding exhaust gas mass flows if necessary. Furthermore the SCR-efficiency qualifies as NOx-value. Therefore NOx is used before and after the SCR-catalyzer considering the actual exhaust gas mass flow. Preferably the difference of the efficiency from a model compared with the actual efficiency is evaluated as comparison parameter. For determining values, which mirror the NOx-conversion or the NOx-conversion efficiency, preferably at least two NOx-sensors are used. Preferably a usual NOx-sensor can therefore be arranged upstream of the SCR-catalyzer and a usual NOx-sensor downstream of the SCR-catalyzer. As an alternative to the NOx-sensor upstream of the SCR-catalyzer a NOx-emission model can be used for determining corresponding values.

A value for the NOx-mass flow can be determined with the NOx-sensor downstream of the SCR-catalyzer, by integrating for example the measured value of the NOx-concentration over a default period of time, for example 15 seconds. A corresponding value, which represents the actual state before a system intervention for adapting the $NH_3$-filling level (phase a), is detected or stored as value A. the corresponding values can also be recorded by delaying signals in such a way that the determined values represent the corresponding phase before the system intervention. This has the advantage that the detection of value A can be carried out simultaneously with the system intervention. Hereby the required period of time for the reasonability check can be shortened more. After the system intervention (phase b) a corresponding value (value B) of the comparison parameter is detected and stored, whereby the value B represents the state after the system intervention. In a particularly preferred embodiment the measured NOx-mass flow is used as comparison parameter compared with a NOx-mass flow, which is calculated from the SCR-model. This comparison can for example be recorded as difference of the calculated and the measured NOx-mass flow. This comparison or the corresponding difference creation is carried out for phase a (value A) and for phase b (value B). this applies accordingly to a third phase c, in which at least a further value of the comparison parameter is detected as value C, in order to verify the result of the reasonability check by a further system intervention in the opposite direction.

For the reasonability check of the adaptation it is evaluated how far the comparison parameter(s) change by the system intervention. If for example the value that is measured as NOx-mass flow is higher in phase a (value A) than in phase b (value B), the reasonability of the system intervention can be assumed. If the value B is higher in that example than value A, not reasonable or not precisely can be assumed. In that case the adaptation has to be corrected. As long as during the comparison of the comparison parameters between phase a (value A) and phase b (value B) an only low or no significant difference can be registered, it can be assumed that the result of the reasonability check of the system intervention is not precisely.

With a particular advantage two or more comparison parameters are used for the procedure according to the invention. The NOx-concentration and also the NOx-conversion efficiency can be for example considered and be evaluated for the reasonability check of the adaptation as corresponding values A and values B, which represent the states before and after the system intervention. Thereby the accuracy and reliability of the procedure can be increased more.

In a particularly preferred embodiment of the procedure according to the invention a long-term correction is influenced depending on the result of the reasonability check that has been carried out according to the invention, by adjusting for example a long-term correction factor. The long-term correction factor or a long-term adaptation factor can for example be adjusted in small steps directly after a successful reasonability check. Particular advantageous is that the long-term correction factor is only changed after at least two comparable results of the reasonability check, which means after two or more reasonability checks with basically the same result. In the cases, in which the reasonability check indicates a not precise result, a change of the long-term correction factor is preferably not carried.

Depending on the defaults, which go into the determination or the theoretical NOx-value(s), in particular depending on the SCR-model, which should also provide a sufficiently high accuracy even during dynamic driving conditions, the procedure according to the invention advantageously allows a reasonability check of the adaptation of the $NH_3$-filling level even during a dynamic driving operation. In other embodiments the results of the reasonability check can be rejected at dynamic driving conditions, so that the reliability of the procedure according to the invention remains.

In another particularly advantageous embodiment the threshold value for the difference between NOx_mod and NOx_sens is adjusted to the operating state, in particular the driving operation or it is provided that different thresholds are preset for different driving operations, in between which it can be shifted if necessary. This embodiment increases the reliability of the reasonability check that has been carried out according to the invention and allows furthermore a corresponding reasonability check at a number of operating states, in particular at different driving operations.

Particular advantageously the temperature in the SCR-catalyzer is considered at the evaluation of the reasonability check, because the temperature has an influence upon the storage capability of the SCR-catalyzer and upon the catalytic reaction itself.

Thereby the reliability and reproducibility of the procedure according to the invention is also improved. Additionally reasonability checks, which are not precisely and for example based on temperature changes, can be detected with this measure and filtered out.

Particularly advantageously a system intervention is carried out by increasing the $NH_3$-filling level in a theoretical model for controlling or regulating the metering amount, in order to carry out an adaptation of the $NH_3$-filling level in the SCR-catalyzer. By increasing the $NH_3$-filling level in the theoretical model the actual metering of the reactant is reduced or temporarily turned off. This reduction or turning off of the actual metering of the reactant is in particular carried out at systems, which are usually operated with a $NH_3$-supply, thus a slight over-metering. At other systems, which are for example operated with a slight under-metering of the reactant, it is particularly preferred if an actual increase of the metering of the reactant is carried out as regular system intervention for adapting the NH$_3$-filling level.

Preferably NOx_mod and NOx_sens as theoretical and measured NOx-values after the SCR-catalyzer are basically continuously compared with each other during the operation of the SCR-catalyzer. Thereby the system can react immediately with an adaptation of the NH$_3$-filling level and reasonability check as soon as these values deviate from each other and a slip is determined.

The invention comprises furthermore a computer program, which carries out all steps of the procedure according to the invention, if it runs on an arithmetic unit or control unit. The invention finally also comprises a computer program product with a program code, which is saved on a machine-readable medium, for implementing the procedure according to the invention, if the program is carried out on an arithmetic unit or a control unit. This computer program or computer program product can be particularly advantageously used at a procedure for operating a combustion engine, which provides a SCR-catalyzer and a metering device for supplying the SCR-catalyzer with reactant in the exhaust gas area, in order to enable a reasonability check of the possibly necessary adaptation of the filling level with reactant in a particularly quick and reliable way. It allows an optimization of the nitrous gas emissions for operating a combustion engine with a SCR-catalyzer.

Further advantages and features result from the subsequent description of embodiments together with the drawings and the sub-claims. Hereby the different features can be realized by themselves or in combination with each other.

DETAILED DESCRIPTION

A motor vehicle with a standard exhaust gas system with a SCR-catalyzer can for example be used as construction for implementing the procedure according to the invention. Applicable arrangements in the exhaust gas streaming direction are for example an oxidization catalyzer, a metering unit for NH$_3$-splitting reagents or reactants and a SCR-catalyzer with a downstream NOx-sensor. Another applicable arrangement comprises for example an oxidization catalyzer, a diesel particle filter, a metering unit for NH$_3$-splitting reagents or reactants and a SCR-catalyzer with a downstream NOx-sensor.

Advantageously the NOx-value (NOx_mod) that is calculated according to a theoretical model, in particular the NOx-value that is calculated according to the SCR-model and the NOx-value (NOx_sens) that is measured with a NOx-sensor downstream of the SCR-catalyzer are basically continuously compared with each other during the operation of the SCR-catalyzer. Thereby it can be ensured that the system can react immediately as soon as a deviation of these values from each other occurs and thus an adaptation for optimizing the exhaust gas treatment with regard to the nitrous gases shall be carried out.

Figure 1:
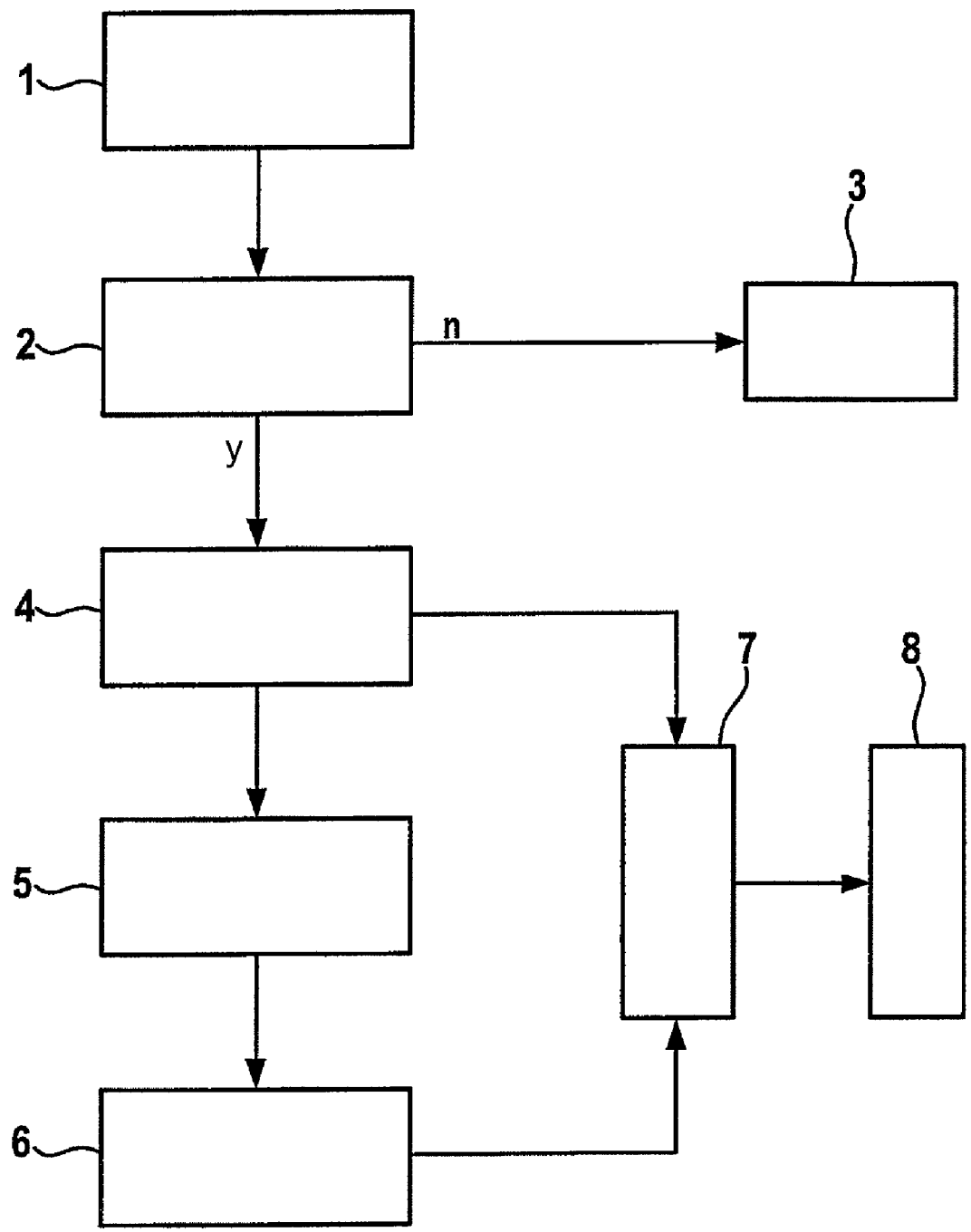
FIG. 1 shows schematically a block diagram for illustrating the procedure according to the invention.

The flow chart that is schematically shown in FIG. 1 shows the different steps, which can be carried out according to the invention at a reasonability check of the adaptation of the NH$_3$-filling level of a SCR-catalyzer, in order to operate a combustion engine, which provides in is exhaust gas area at least one SCR-catalyzer with a NH$_3$-filling level, at least one metering device for supplying the SCR-catalyzer with reactant for reducing nitrous gases and at least one downstream NH$_3$-sensitive NOx-sensor. A theoretical value (NOx_mod) is determined for a NOx-value downstream of the SCR-catalyzer. This determination can take place by a theoretical default, for example by a so-called SCR-model. This value is compared in step 1 with a NOx-value (NOx_sens) that has been measured by the NOx-sensor. This step is already carried out in the state of the art, in order to be able to carry out an adaptation of the NH$_3$-filling level of the SCR-catalyzer in the case of deviations of the values from each other. With the aid of this comparison it is analyzed in step 2, whether a deviation of those two values reaches or exceeds a default threshold value. As long as this is not the case, an adaptation of the NH$_3$-filling level and therefore a reasonability check of an adaptation is not required according to step 3. But if the difference of these two values reaches or exceeds a default threshold value, the reasonability check is carried out according to the invention with the following steps. In step 4 at least one value (value A) of at least one comparison parameter is detected and in particular recorded and stored. The value A represents the statuses before a system intervention in the so-called phase a. in step 5 a system intervention takes place in order to induce an adaptation of the NH$_3$-filling level in the SCR-catalyzer. This step can be carried out after step 4. But it can also be provided that the system intervention according to step 5 takes place before or during the recording of value A according to step 4. Thereby the detection of value A according to step 4 can be carried out for example by a corresponding delay of the signals in such a way that the values represent the status in phase a. after the system intervention according to step 5 in step at least one value (value B) of the comparison parameter is detected, in particular recorded and stored, which represents the status after the system intervention and therefore in particular mirrors the reaction of the system upon the system intervention. (phase b). In step 7 the values A and B that are recorded in phase a and b are compared to each other and with the aid of the result of this comparison it is assumed in step 8 whether the system intervention was reasonable or not reasonable or not precisely. Depending on the checked comparison parameter plausibility can be assumed for example at a value A that is higher than value B (value A>value B), not reasonable can be assumed at a value A smaller than value B (value A<value B) and not precisely can be assumed at a smaller or lower difference between value A and value B (value A=value B). This applies for example if a difference between NOx_mod and NOx_sens is used as comparison parameter. If for example the efficiency of the SCR-catalyzer is observed as comparison parameter, the relations are the other way around, which means the efficiency gets better, if the system intervention is reasonable. On the other hand the efficiency gets worse or lower if the system intervention is not reasonable.

Figure 2:
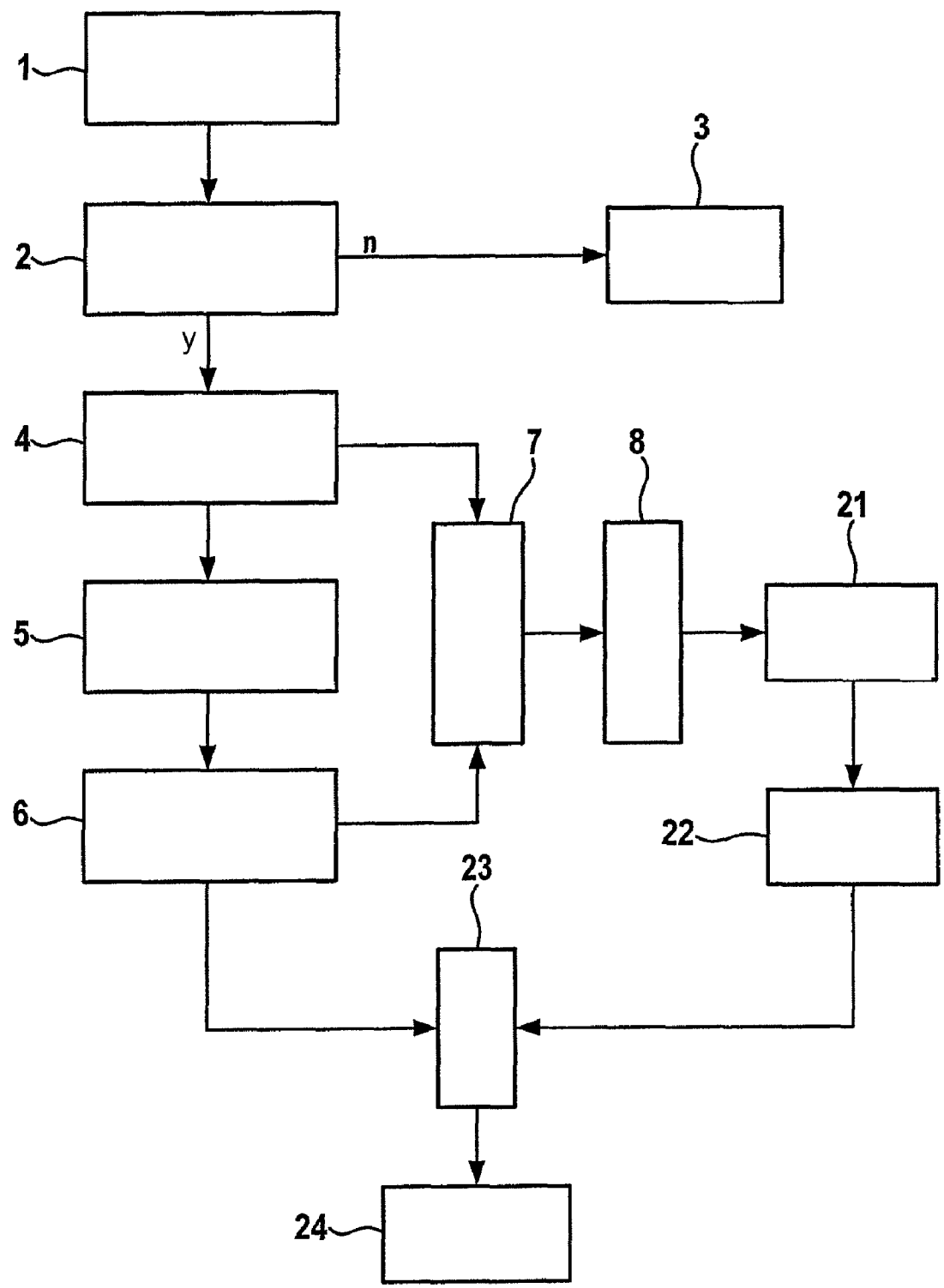
FIG. 2 shows schematically a block diagram for illustrating a further preferred embodiment of the procedure according to the invention with a checking of the result of the reasonability check.

FIG. 2 schematically shows a further preferred embodiment of the procedure according to the invention. The block diagram that is shown in FIG. 2 is equivalent to the steps 1 to 8 of the procedure that is illustrated in FIG. 1 and is provided with the same reference signs. In this embodiment the result of the reasonability check is checked by a further system intervention 21 and by detecting a further value (value C) of the at least one comparison parameter in step 22. With the aid of a comparison of value B and value C in step 23 it can be assumed whether the result of the reasonability check is coherent or incoherent (step 24). The system intervention that is carried out in step 21 is undertaken with opposite reference signs than the system intervention that has been carried out in step 5, which means that for example at a lowering of the metering amount in step 5 an increasing of the metering amount takes place in step 21. If now depending on each comparison parameter the value C is for example lower than the value B that has been determined after the first system intervention, it has to be assumed that the result of the reasonability check was correct and coherent. If the value C is higher than value B the result of the plausibility check cannot be considered as coherent. This checking of the result of the plausibility check can in particular be used advantageously if the result of the plausibility check does assume not reasonable. With a counter checking for example by a short-term overdosing this result can be checked in order to be able to ensure for example a secure basis for a long-term correction of the system.

Different values qualify as comparison parameters, which mirror in particular the exhaust gas composition and preferably the NOx-emissions downstream of the SCR-catalyzer. In particular NOx-values can be used as comparison parameters, preferably measured NOx-values, compared to NOx-values from a theoretical model, in particular the SCR-model, whereby the difference of these values in phase a as value A and in phase b as value B are for example compared with each other. Applicable examples for these NOx-values are the NOx-mass flow, the NOx-concentration, the NOx-conversion and/or the NOx-conversion efficiency. A further NOx-sensor is preferably provided in particular for determining the NOx-conversion or the corresponding efficiency, which is arranged upstream of the SCR-catalyzer and which can therefore for example measure the NOx-concentration, which is present before the catalytic conversion of the nitrous gases in the SCR-catalyzer. Particularly advantageously two or more of these comparison parameters can be compared to each other in order to improve the accuracy and reliability of the reasonability check according to the present invention more.

In a particularly preferred embodiment mass flows [mg] of NOx_mod and NOx_sens that has been integrated over the time are used as NOx-values. Also suitable are concentration statements for NOx_mod and NOx_sens, whereby for example suitable average values are created by an integral. Furthermore the use of the difference of NOx-conversion efficiency from model and measurement is suitable according to the invention.

In the following the implementation of the procedure according to the invention is explained by two examples. In the first example the metering amount of $NH_3$ in the SCR-catalyzer is too low, so that NOx can be sufficiently converted, so that too much NOx leaves the SCR-catalyzer, which means a NOx-slip occurs. In the second example the metering amount of $NH_3$ is too high, so that excessive $NH_3$ leaves the SCR-catalyzer and is released as $NH_3$-slip. In both cases the NOx-sensor that is downstream of the SCR-catalyzer measures an increased NOx-value in comparison with the theoretical NOx-value. Because the NOx-sensor provides a sum signal of NOx and $NH_3$ this increased value allows no assumption whether the increased value is based on a NOx-slip or a $NH_3$-slip.

Figure 3:
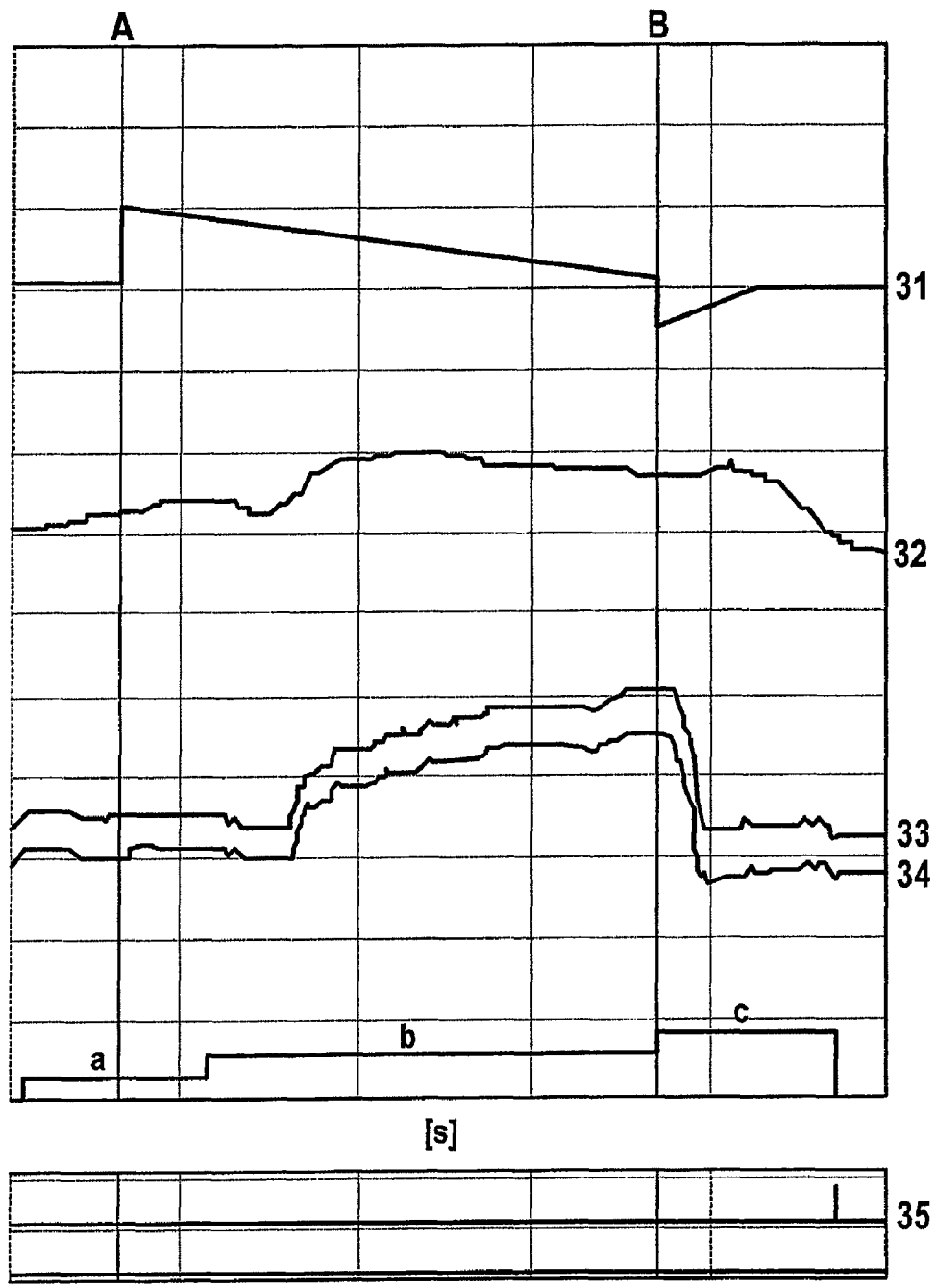
FIG. 3 shows courses of different status parameters and system defaults above the time at the implementation of the procedure according to the invention by the example of a too low NH$_3$-metering.

The courses of the different state parameters and system defaults in a temporal course during the implementation of the procedure according to the invention are illustrated for the first example in FIG. 3. Seconds are registered on the abscissa. The course 32 shows the raw data for NOx. The course 33 shows the values (NOx_sens) after the SCR-catalyzer that have been detected by a NOx-sensor. The course 34 shows the difference between the model values NOx_mod and NOx_sens. Phases a, b and c that are shown in the lower part represent a stock-checking (phase a), the system reaction after a system intervention (phase b) and a counter-checking (phase c) at a under-metering that has been determined in this example. In phase a a slip has to be determined for example with the aid of the increasing NOx-raw data. Because the system is usually operated with a $NH_3$-surplus, it is first assumed that the slip is $NH_3$. Therefore the estimated filling level 31 in the SCR-model at the point of time A is increased for adapting the $NH_3$-filling level as a system intervention, so that the metering of the reactant is reduced or temporarily turned off as a result. Simultaneously the stock-checking (phase a) begins, in which values of a comparison parameter are recorded and stored as value A. Therefore the measured NOx-mass flow and the NOx-mass flow of the model (NOx_mod) after SCR are integrated over the time for over 15 seconds with the aid of the NOx-sensor (NOx_sens) that is downstream of the SCR-catalyzer, in order to create applicable average values. The difference between NOx_mod and NOx_sens is illustrated as course 34. The signals are correspondingly delayed, in order to detect the phase before the system intervention or the filling level increase in the model. Each average value is calculated for detecting the value A and stored in a memory. Phase b follows. In that phase the reaction of the system upon the filling level increase in the model is checked. Therefore the NOx-mass flow of the model after the SCR and the NOx-mass flow of the sensor after the SCR-catalyzer are integrated over a period of time of approximately 30 seconds and applicable average values are created for detecting the value B. the difference between model and sensor in phase b is higher than in phase a (value A<value B) or in other words the course 34 increase in phase b. Therefore it has to be assumed that the slip is a NOx-slip and not a $NH_3$-slip as it was first assumed. If the slip existed before the system intervention of NOx, a turning off of the metering results in an increase of the NOx-amount after the SCR-catalyzer. The procedure recognizes this according to the present invention thereby that the value B, thus the difference between model and sensor in phase b, is higher than the value A of phase a. as soon as this is detected by a comparison of value A and B and the non-reasonability of the carried out system intervention has been concluded, the estimated filling level in the SCR-catalyzer can be put to a lower value below the nominal value, in order to be able to fill the SCR-catalyzer again with $NH_3$. Preferably this result can be used, in order to be able to influence a long-term correction factor in another function.

In a particularly preferred embodiment of the procedure according to the invention a further checking or verification of this result is carried out in particular at the result not reasonable. Therefore a further short-term system intervention is carried out in phase c, in which the actual filling level 31 in the SCR-model is temporarily lowered at the point of time B as it is shown in FIG. 3. This results in a short-term over-metering of the reactant. The system reacts hereupon with a lowering of the NOx-values 32 and a considerable lowering of the value C of the comparison parameter 34, thus the difference of NOx_mod and NOx_sens. Thereby the result that has been determined in phase b is checked and verified regarding a non-reasonability of the system intervention, so that not reasonable 35 can be clearly assumed.

If the difference of NOx_mod and NOx_sens is for example used as comparison parameter, the values in the mentioned example should become smaller at the checking in phase c, if the result not reasonable was correct. If the efficiency of the NOx-conversion is used as comparison parameter the value should become better or higher in phase c.

Phase a of the reasonability check according to the invention's procedure can be for example carried out over a period of time of approximately 10 seconds until approximately 20 seconds, in particular 15 seconds. Phase b of the reasonability check can preferably be carried out for a period of time of approximately 10 seconds to approximately 40 seconds, in particular 30 seconds. Phase c for checking the result can for example be carried out over a period of time of approximately 10 seconds.

Figure 4:
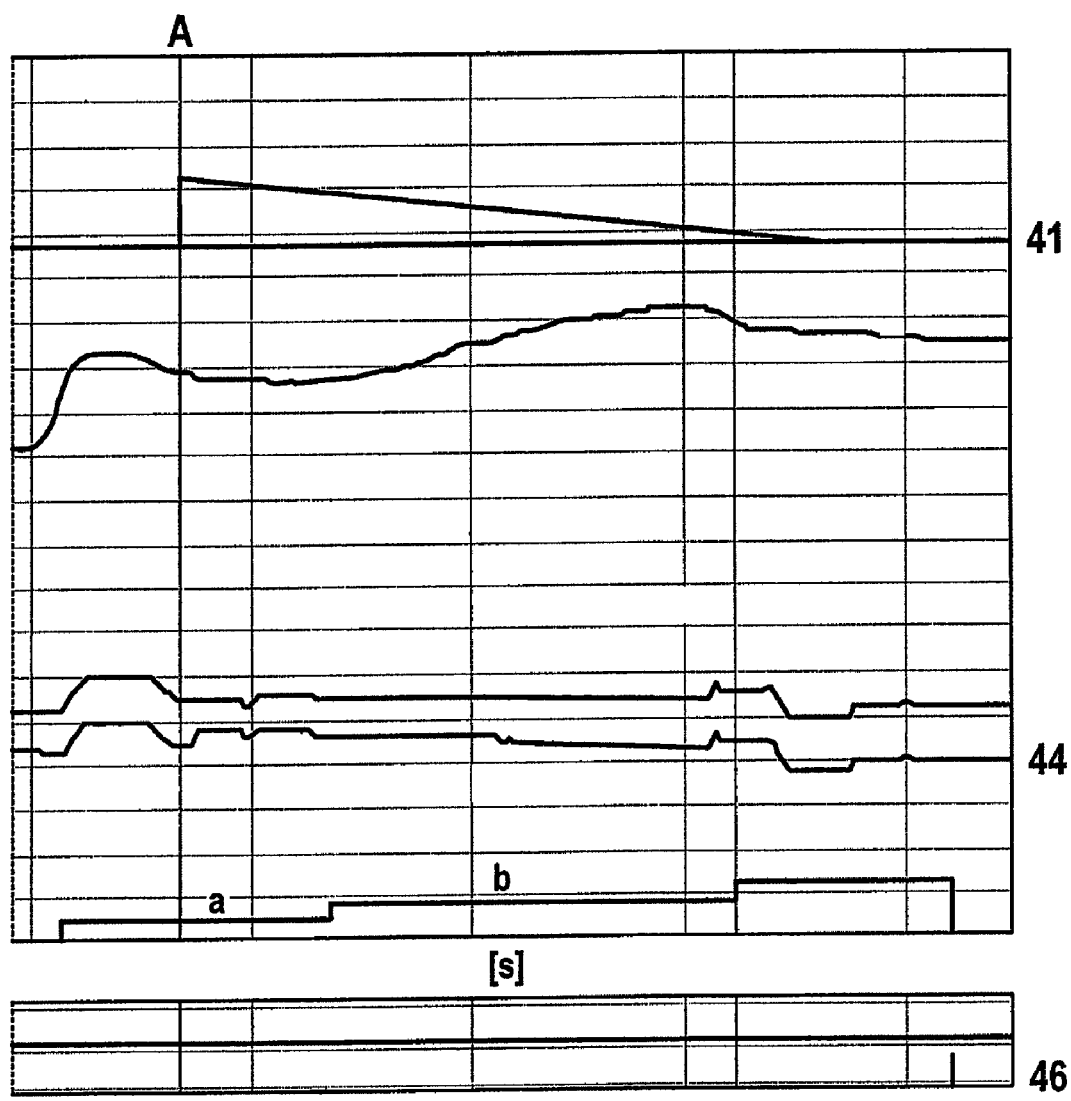
FIG. 4 shows courses of different status parameters and system defaults above the time at the implementation of the procedure according to the invention by the example of a too high NH$_3$-metering.

Even in the second example with a too high $NH_3$-metering amount the system detects in phase a a slip by comparing the measured NOx-value after the SCR-catalyzer and the calculated NOx-value from the SCR-model after SCR. The courses of the different state parameters and system defaults over the time are illustrated in FIG. 4. Because the system is usually operated with a $NH_3$-surplus it is assumed that the slip is $NH_3$. Correspondingly the estimated filling level 41 in the SCR-catalyzer is increased, so that the metering of $NH_3$ or reactant is reduced or temporarily turned off as a result. In order to describe the state before the system intervention a value of the comparison parameter 44 (value A) is detected in phase a and a value of the comparison parameter 44 (value B) after the system intervention in phase b like in the first example, which means measured and stored. Thereby in particular the NOx-mass flow is detected as difference between NOx_mod and NOx_sens. The values A and B that have been recorded according to the first example are compared to each other and evaluated. In this example the difference between the theoretical NOx-value and the measured NOx-value in phase b is smaller than in phase a or in other words the values of the comparison parameter sink. It can be thereof assumed that the implemented adaptation is reasonable 46 and that the slip is therefore indeed $NH_3$. If the slip existed before the filling level increase indeed of $NH_3$, a turning off of the metering results in a sinking of the $NH_3$-amount in the SCR-catalyzer, because a conversion of NOx causes a lowering of $NH_3$ in the SCR-catalyzer. This applies in particular under the condition that no or only a slight change of the temperature in the SCR-catalyzer is provided. The system according to the invention recognized this and verifies the $NH_3$-surplus or the $NH_3$-slip thereby that the result according to the invention allows to assume reasonability. This information can also be preferably collected and correspondingly used for adjusting a long-term correction factor.

The particular advantage of the procedure according to the invention is that at a detected slip by comparing a theoretical NOx-value downstream of the SCR-catalyzer with a measured NOx-value downstream of the SCR-catalyzer the $NH_3$-storage capacity in the model is increase once—and not several times—and the reaction of the system is check immediately. That enables a continuously high NOx-conversion during the adaptation. The reasonability check according to the invention can be carried out very fast, for example within only approximately 45 seconds. The result of the reasonability check is very accurate, in particular at stationary operating statuses. In the case of not precise reasonability checks, for example at unsteady operating statuses, the result can be rejected. In other cases reliable results can be for example also achieved at these operating statuses by a suitable adjustment of threshold values. Even at a high deviation of the $NH_3$-pre-control amount, for example at a high overdosing of $NH_3$, the optimal metering amount can be adjusted in a very short period of time.

The invention claimed is:

1. A method of operating a combustion engine that has in an exhaust gas area at least one SCR-catalyzer with a NH3-filling level, at least one metering device for supplying the SCR-catalyzer with a reactant for reducing nitrous gases, and at least one downstream NH3-sensitive NOx-sensor, the method comprising:
   determining at least one theoretical NOx-value downstream of the SCR-catalyzer;
   comparing the at least one theoretical NOx-value to an actual NOx-value downstream of the SCR-catalyzer, wherein an adaptation of the NH3-filling level of the SCR-catalyzer is carried out based on the comparison; and
   performing a reasonability check of the adaptation by:
      detecting a first value for at least one comparison parameter that represents a state before a system intervention for adapting the NH3-filling level;
      performing a first system intervention for adapting the NH3-filling level;
      detecting a second value of the at least one comparison parameter;
      performing a second system intervention in an opposite direction of the first system intervention;
      detecting a third value of the at least one comparison parameter; and
      comparing the first value, the second value, and the third value, wherein with aid of comparison results of the comparisons of the values, the reasonability, non-reasonability, or non-preciseness of the system interventions are assumed.

2. The method of claim 1, wherein the at least one comparison parameter is at least one NOx-value, in particular a NOx-value measured downstream of the SCR-catalyzer.

3. The method of claim 2, wherein the at least one NOx-value is a NOx-mass flow, a NOx-concentration, a NOx-conversion, and/or a NOx-conversion efficiency.

4. The method of claim 1, wherein the at least one comparison parameter is a theoretical NOx-value compared to an actual NOx-value downstream of the SCR-catalyzer, wherein the at least one comparison parameter is a difference of the theoretical NOx-value and the actual NOx-value.

5. The method of claim 1, further comprising considering an exhaust gas mass flow at the comparison of the first value with the second value.

6. The method of claim 1, further comprising using two or more comparison parameters.

7. The method of claim 1, further comprising adjusting a long-term correcting factor depending on the result of the reasonability check.

8. The method of claim 7, further comprising adjusting the long-term correcting factor after at least two comparable results of the reasonability check.

9. The method of claim 1, further comprising performing the reasonability check of the adaptation at a dynamic driving operation.

10. The method of claim 1, further comprising adjusting a threshold value or a difference between the at least one theoretical NOx-value downstream of the SCR-catalyzer and the actual NOx-value downstream of the SCR-catalyzer to an operating state of the engine, in particular a driving operation.

11. The method of claim 1, further comprising considering a temperature in the SCR-catalyzer at the reasonability check.

12. The method of claim 1, wherein the at least one system intervention is an increasing of the NH3-filling level in a model for adapting NH3-filling levels in the SCR-catalyzer.

13. The method of claim 1, further comprising continuously comparing the at least one theoretical NOx-value and the actual NOx-value to each other during operation of the SCR-catalyzer.

14. The method of claim 1, wherein the adaptation of the NH3-filling level of the SCR-catalyzer is carried out within about 45 seconds based on the comparison.

15. The method of claim 1, wherein the adaptation of the NH3-filling level of the SCR-catalyzer is carried out within about 30 seconds based on the comparison.

16. The method of claim 1, wherein the reasonability check of the adaptation is carried out simultaneously with the system intervention.

17. The method of claim 1, wherein at least one signal representing at least one of the first value and the second value is delayed before the system intervention.

18. A computer-implemented method for operating a combustion engine that has in an exhaust gas area at least one SCR-catalyzer with a NH3-filling level, at least one metering device for supplying the SCR-catalyzer with a reactant for reducing nitrous gases, and at least one downstream NH3-sensitive NOx-sensor, the computer-implemented method comprising the steps of: determining at least one theoretical NOx-value downstream of the SCR-catalyzer; comparing the at least one theoretical NOx-value to an actual NOx-value downstream of the SCR-catalyzer, wherein an adaptation of the NH3-filling level of the SCR-catalyzer is carried out based on the comparison; and performing a reasonability check of the adaptation by: detecting a first value for at least one comparison parameter that represents a state before a system intervention for adapting the NH3-filling level; performing a first system intervention for adapting the NH3-filling level; detecting a second value of the at least one comparison parameter; performing a second system intervention in an opposite direction of the first system intervention; detecting a third value of the at least one comparison parameter; and comparing the first value, the second value, and the third value, wherein with aid of comparison results of the comparisons of the values, the reasonability, non-reasonability, or non-preciseness of the system interventions are assumed.

19. A computer program product with a program code stored on a non-transitory machine-readable medium and executed on a control unit for operating a combustion engine that has in an exhaust gas area at least one SCR-catalyzer with a NH3-filling level, at least one metering device for supplying the SCR-catalyzer with a reactant for reducing nitrous gases, and at least one downstream NH3-sensitive NOx-sensor, the program code including instructions for: determining at least one theoretical NOx-value downstream of the SCR-catalyzer; comparing the at least one theoretical NOx-value to an actual NOx-value downstream of the SCR-catalyzer, wherein an adaptation of the NH3-filling level of the SCR-catalyzer is carried out based on the comparison; and performing a reasonability check of the adaptation by: detecting a first value for at least one comparison parameter that represents a state before a system intervention for adapting the NH3-filling level; performing a first system intervention for adapting the NH3-filling level; detecting a second value of the at least one comparison parameter; performing a second system intervention in an opposite direction of the first system intervention; detecting a third value of the at least one comparison parameter; and comparing the first value, the second value, and the third value, wherein with aid of comparison results of the comparisons of the values, the reasonability, non-reasonability, or non-preciseness of the system interventions are assumed.

* * * * *